Dec. 1, 1936.  M. S. CANADAY  2,062,739
CORN CUTTING APPARATUS
Filed Oct. 18, 1935  3 Sheets-Sheet 1

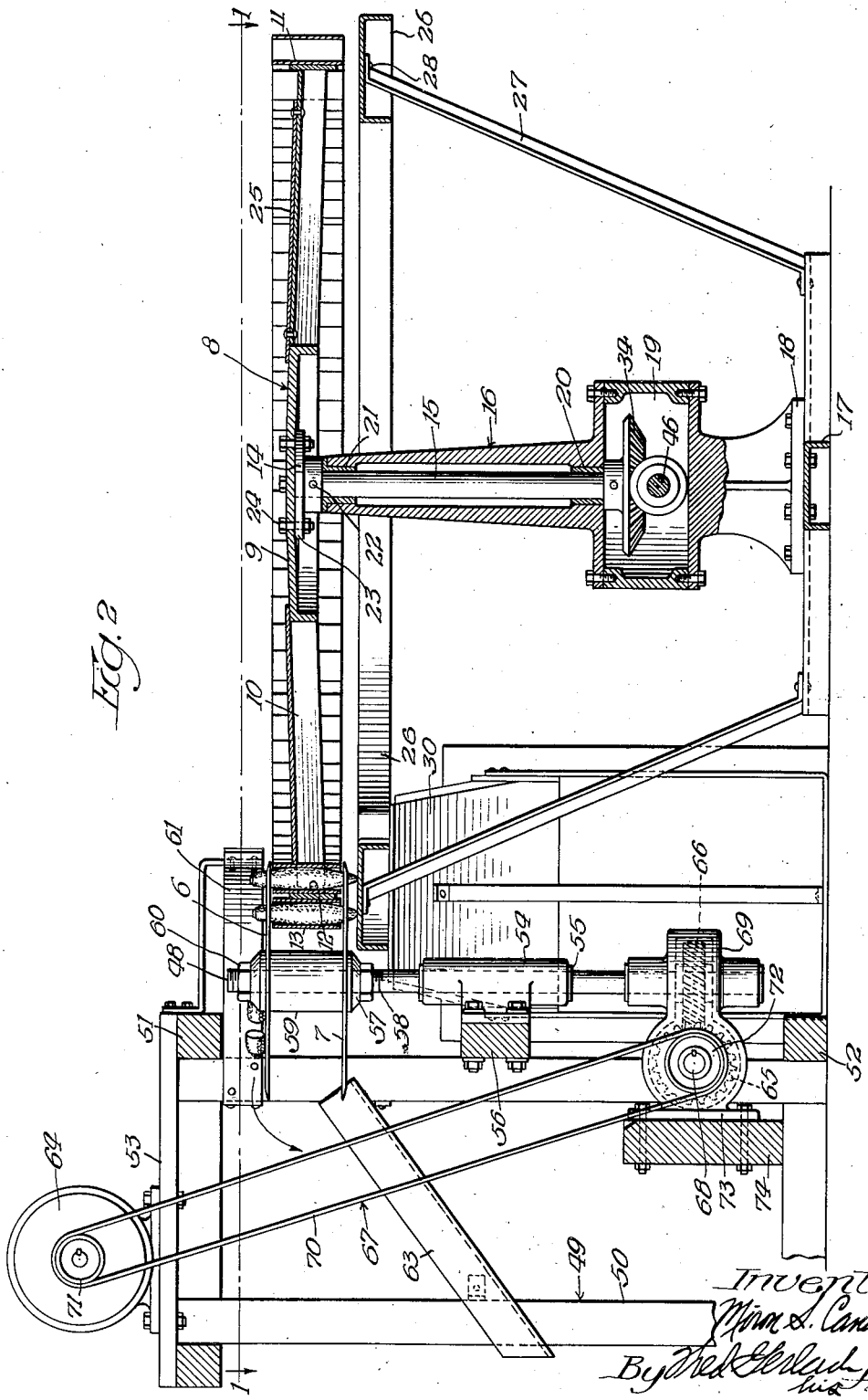

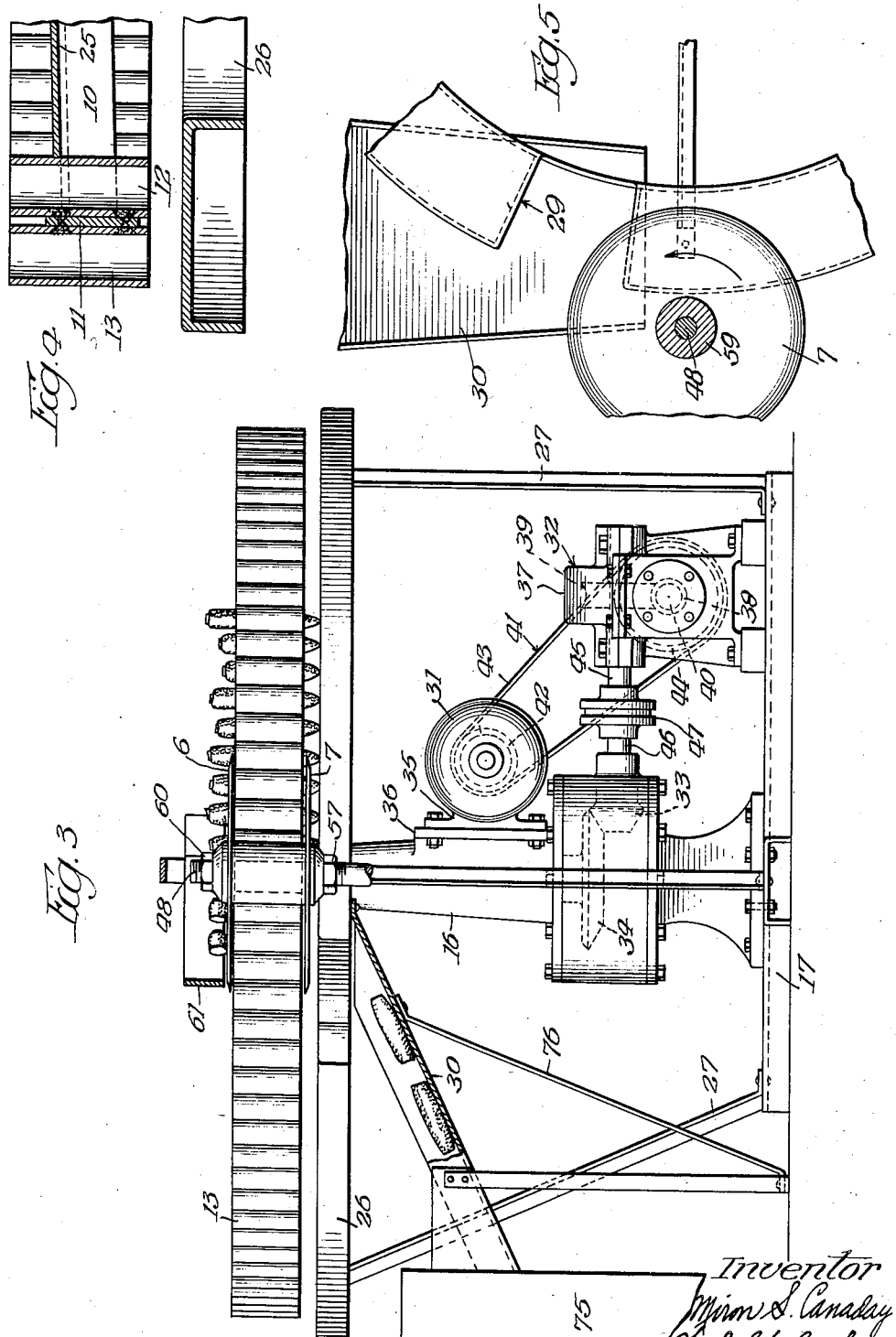

Patented Dec. 1, 1936

2,062,739

UNITED STATES PATENT OFFICE 2,062,739

CORN CUTTING APPARATUS

Miron S. Canaday, Rochester, Minn., assignor to Reid, Murdoch & Co., Chicago, Ill., a corporation of Illinois Application October 18, 1935, Serial No. 45,535

3 Claims. (Cl. 146—84)

The present invention relates generally to apparatus for cutting ears of corn. More particularly the invention relates to that type of cutting apparatus which is used in canneries and like establishments and is adapted to cut ears of corn so that they are equal or uniform in length and are thus in condition for canning.

One object of the invention is to provide a corn cutting apparatus of this type which is extremely fast as far as operation is concerned and comprises as the main or essential parts thereof: (1) A rotary, horizontally extending, disk-like carrier having vertical, open-ended tubes at the margin thereof for receiving and holding in a vertical position the ears of corn to be cut; (2) a stationary ring which is concentrically arranged with respect to, and is disposed slightly beneath the tubes on the margin of the carrier and serves to support the ears of corn and to prevent them from dropping from the tubes during rotation of the carrier; and (3) a pair of horizontally extending, vertically spaced, disk-type, motor driven, knives which are positioned one above and one below the tubes and are adapted during drive thereof and during rotation of the carrier successively to cut off the top and bottom ends of the ears of corn.

Another object of the invention is to provide a corn cutting apparatus of the last mentioned type and character which embodies novel means whereby the ears of corn are discharged from the tubes after the ends are cut therefrom, and includes but a small number of parts so that it may be produced at a low and reasonable cost.

A further object of the invention is to provide a corn cutting apparatus which is generally of new and improved construction.

Other objects of the invention and the various advantages and characteristics of the present corn cutting apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 2 is a vertical longitudinal section on the line 2—2 of Figure 1;

Figure 3 is a vertical transverse section on the line 3—3 of Figure 1;

Figure 1:
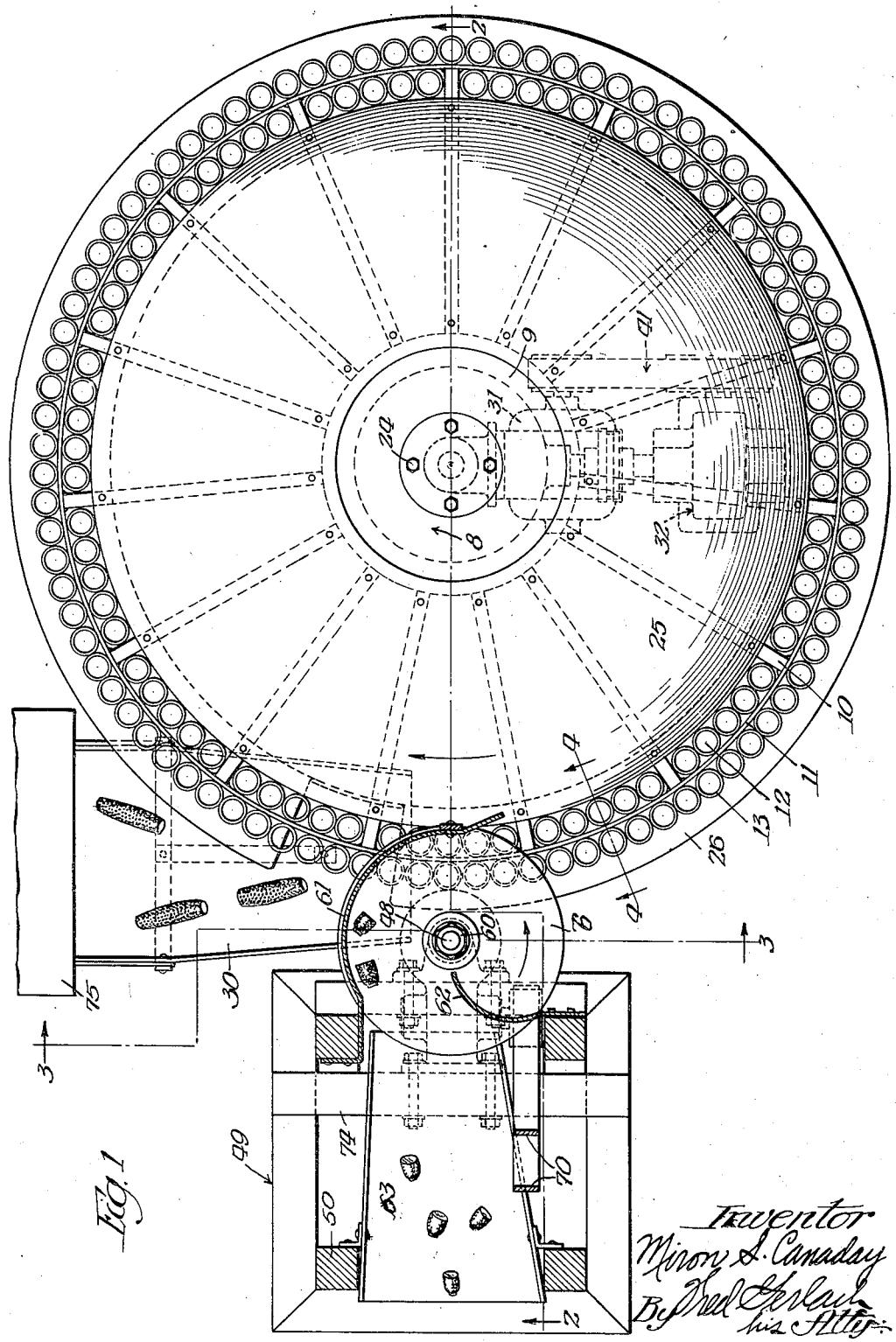
Figure 1 is a view partially in plan elevation and partially in horizontal section of a corn cutting apparatus embodying the invention.

Figure 4 is a detail section taken on the line 4—4 of Figure 1 and showing in detail the construction and arrangement of the open ended tubes for supporting the ears of corn in upright position; and Figure 5 is a detail horizontal sectional view showing the means whereby the ears of corn are released or discharged from the tubes on the margin of the carrier after the ends thereof have been severed by the knives.

The apparatus which forms the subject matter of the invention is adapted for use in connection with a corn canning establishment and serves, as hereinafter described, to cut ears of corn so that they are the same or equal in length and are thus in condition to be canned as "corn on the cob". As shown in the drawings, the apparatus comprises a pair of horizontally extending, vertically spaced, disk-type knives 6 and 7, and a rotary carrier 8 for holding the ears of corn in a vertical position and successively feeding them past the knives 6 and 7 in such manner that the latter operates respectively to cut off the upper and lower ends of the ears and thus trim the ears so that they are of uniform or equal length.

The carrier 8 extends horizontally and consists of a hub 9, a plurality of equidistantly spaced, radially extending, spoke-like members 10, a band-type rim 11, an inner annular series of vertically extending, corn-holding tubes 12, and an outer annular series of vertically extending, corn-holding tubes 13. The hub 9 embodies a depending marginal flange and is connected by a collar 14 to the upper end of a shaft 15 which extends vertically and is rotatably mounted in the upper end of a cast metal standard 16. The latter, as shown in Figure 2, rests on and is supported by the central portion of a pair of crossed channel bars 17 and serves to hold the carrier 8 in an elevated position with respect to the floor of the corn canning establishment in which the apparatus is used. The lower end of the standard 16 is solid and embodies an annular flange 18 which overlies the web portions of the bars 17 and is secured to the latter by means of bolts. The central portion of the standard is shaped to form an enlarged gear chamber 19 and the upper end of the standard is tubular and communicates with the aforesaid chamber 19. The shaft 15 extends longitudinally through the tubular upper end of the standard and is journaled at its lower end in a bearing 20 and at its upper end in a bearing 21. The bearing 20 is fixedly secured in the lower portion of the upper end of the standard and is disposed directly above the gear chamber 19. The bearing 21 is fixedly secured in the upper portion of the upper end of the standard and underlies the collar 14. The latter, as shown in Figure 2, is connected to the upper end of the shaft 15 by a pin 22 and is provided with an outwardly extending flange 23 which underlies the central portion of the hub 9 and is fixedly secured to the hub by an annular series of bolts 24. The collar 13, together with the pin 22 and the bolts 24, serves drivably to connect the carrier to the shaft 15. The spoke-like members 10 support a sheet metal annulus 25 and are welded or otherwise fixedly secured at the inner ends to the depending marginal flange on the hub 9. The annulus 25 is secured to the top portions of the spoke-like members 10 and serves as a table or pan on which the ears of corn may be placed or piled prior to insertion within the tubes 12 and 13, as hereinafter described. The rim 11 encircles the outer ends of the spoke-like members 10. It is welded or otherwise fixedly secured in place and overlies and is concentrically positioned with respect to a stationary supporting ring 26 which, as hereinafter described, supports the ears of corn while they are in the tubes 12 and 13. The tubes 12 of the inner series, extend around and are welded to the inner face of the rim 11, and are adapted, as shown in Figures 2 and 3, to have ears of corn inserted therein and to hold the ears loosely and in a vertical position. Preferably the ears are inserted into the tubes 12 so that the ends having the stems are at the top portion of the carrier and the other or small ends project through the lower ends of the tubes 12 and rest on the supporting ring 26. The tubes 13 of the outer series are positioned radially outward with respect to the tubes 12 and fit against and are welded to the outer face of the rim 11 (see Figure 4). They are the same in length as the tubes 12 and like the latter tubes are adapted to have ears of corn inserted therein and to hold the ears loosely and in a vertical position with the small ends of the ears resting on the supporting ring 26 and the large ends with the stems extending upwards above the tubes. The ring 26 encircles the upper end of the standard 16 and is supported a small distance below the lower ends of the tubes 12 and 13 by means of a plurality of struts 27. These struts extend upwardly and outwardly and are connected at their lower ends to the ends of the bars 17. The upper ends of the struts are angled so that they fit against the bottom face of the supporting ring and are secured to the ring by means of rivets 28. When the carrier is rotated the ears of corn in the tubes 12 and 13 move in a circular course over the supporting ring 26 and are brought successively into range of the knives 6 and 7. The latter serve to cut off the portions of the ears which project beyond the ends of the tubes and thus trim the ears to the desired length. The supporting ring 26 embodies a cut-out 29. This cut-out is positioned adjacent to the knives 6 and 7 and permits the ears of corn, after being cut to length by the knives, to fall from the tubes onto a discharge chute 30.

The carrier 8 is rotated so as to feed the ears of corn in the tubes 12 and 13 successively into range of the knives 6 and 7 by means of driving mechanism which is disposed beneath the carrier. This mechanism comprises an electric motor 31, a speed reducing unit 32 and a pair of bevel gears 33 and 34 between the speed reducing unit and the shaft 15. The electric motor 31 is provided with a base 35 on the casing thereof and this base fits against and is bolted to a plate-like formation 36 on the upper end of the standard 16. The speed reducing unit 32 is positioned to one side of the motor 31 and is mounted on one end of one of the channel bars 17. It is horizontally aligned with the gear chamber 19 in the central portion of the standard 16 and consists of a housing 37, a worm 38, and a worm wheel 39. The worm 38 is disposed in the lower portion of the housing 32 and is mounted on and fixed to a horizontal shaft 40 which is journaled in the housing and has one end thereof projecting outside of the housing. The shaft 40 is driven from the electric motor by means of a belt and pulley connection 41. This connection consists of a pulley 42 on the armature shaft of the motor and a belt 43 which extends around and is driven by the pulley 42 and extends around and serves to drive a pulley 44 on the projecting end of the shaft 40. The worm 38 meshes with and during driving of the shaft 40 serves to drive the worm wheel 39. The latter is mounted on a horizontal shaft 45 which is journaled in bearings in the housing 37 and has one of its ends projecting from the housing and in the direction of the gear chamber 19. The bevel gear 33 is disposed in the gear chamber and is mounted on a shaft 46 which projects from this chamber and is connected to the shaft 45 by means of a coupling 47. The bevel gear 34 is disposed in the gear chamber 19 and is mounted on the lower end of the shaft 15. It meshes with the bevel gear 33 and operates during operation of the motor 31 and drive of the speed reducing unit 32 to drive the shaft 15 and thus effect rotation of the carrier 8. The speed reducing unit 32 and the bevel gears 33 and 34 constitute means for reducing the speed at which the carrier is rotated by the electric motor 31.

The disk-type knives 6 and 7 are mounted on the upper end of a vertically extending shaft 48 and are associated with a supporting structure 49 at one side of the carrier 8 and the supporting ring 26. This structure 49 consists of four up-rights 50, a rectangular top frame 51, and a rectangular bottom frame 52. The top frame is suitably secured to the upper ends of the up-rights 50 and supports a plurality of top-forming cross members 53. The bottom frame 52 is secured to the lower ends of the up-rights and rests on the portion of the floor adjacent to the crossed bars 17. The shaft 48 is journaled in a bearing 54, and is provided with a pair of laterally spaced collars 55 which serve to hold it against axial or longitudinal displacement. The bearing 54, as shown in Figure 2, is secured by bolts to a crossbar 56 which extends between and is attached to the central portion of two of the up-rights 50 of the supporting structure 49. The knife 7 is supported on a nut 57 on an external screw thread 58 at the upper end of the shaft 48. The nut 57 is so located that the knife 7 is disposed but a very small distance beneath the lower ends of the tubes 12 and 13. The knife, as shown particularly in Figure 2 of the drawings, extends over the supporting ring 26 and is of such diameter that the portion thereof that is nearest the standard 16 projects slightly inwards of the inner portions of the tubes 12. When the shaft 48 is driven, as hereinafter described, so as to rotate the knife 7 and the carrier 8 is rotated by means of the electric motor 31, the ears of corn in the tubes 12 and 13 are brought successively into the path of the knife 7 and the latter operates to cut off the small ends of the ears, that is the portions of the ears which rest on the supporting ring 26 and extend between the ring and the lower ends of the tubes 12 and 13. The portions of the ears of corn which are cut by the knife 7 constitute waste and are deflected to one side of the supporting ring 26. The knife 6 is supported on a sleeve 59 and is urged downwards in clamped relation with respect to the sleeve by means of a nut 60 on the extreme upper end of the screw thread 58. The sleeve 59 rests on the knife 7 and serves as a spacer whereby the two knives are held in vertically spaced relation. The nut 60 serves not only to hold the knife 6 in clamped relation with respect to the sleeve but also to clamp the sleeve and the knife 7 downwards against the nut 57 and to connect the two knives for drive or rotation by the shaft 48. The knife 6 is the same in diameter as the knife 7. It is positioned slightly above the upper ends of the tubes 12 and 13 and is of such diameter that the inner portion thereof projects inwards of the tubes 12. During drive of the knife 6 and rotation of the carrier 8, the ears of corn in the tubes 12 and 13 are successively brought into range of the knife 6 and the latter operates to sever the portions of the ears above the upper ends of the tubes. The portions of the ears which are severed by the knife 6 are adapted to be deflected by a pair of deflectors 61 and 62 to a discharge chute 63. This chute 63 is secured to the up-rights 50 of the supporting frame 49. The deflector 61 is substantially semicircular in design and is carried by the upper portion of one of the up-rights 50. It extends from a point adjacent to the inner portion of the knife 6 to a point directly over the upper or receiving end of the chute 63. The deflector 62 overlies and extends radially with respect to the knife 6 and is carried by the upper end of the up-right 50 which is directly opposite the one having the deflector 61. The knife 6 is rotated in the direction indicated in Figure 1 with the result that the severed end portions of the corn are slung against the deflector 61 and are caused to travel along this deflector until they overlie the receiving end of the chute 63. At this point the severed ends of the corn drop downwards onto the chute and then slide on the latter to a receptacle or conveyor (not shown). The deflector 62 serves to prevent any severed corn ends on the knife from being rotated past the receiving end of the chute 62. The nut 57 on the upper end of the shaft 48 serves to support both of the knives. By adjusting this nut the two knives may be bodily raised or lowered with respect to the tubes 12 and 13. In the event that it is desired to change the spacing of the knives so as to effect a change in the length of the cut corn, it is only necessary to remove the nut 60 and the knife 6 from the shaft and then to replace the sleeve 59 with either a longer or a shorter sleeve, depending upon whether it is desired to increase or decrease the length of the cut corn. The cutting edge of the knife 6 is formed by bevelling the edge of the disk which forms the knife. The bevel is formed on the top face of the knife with the result that the cutting edge is flush with the bottom face of the knife and the knife in severing the upper ends of the corn is hence not likely to injure the kernels on the portion of the corn ears within the tubes. The cutting edge of the knife 7 is formed by bevelling the bottom face of the disk which forms the knife in order that it is flush with the top face of the knife and thus does not injure the corn kernels directly above the portions of the corn ears which are severed by the knife 7.

The shaft 48 is driven for knife rotating purposes by means of an electric motor 64 and a pair of spiral gears 65 and 66. The motor 64 is mounted on the cross-members 53 on the top frame 51 and is connected by a belt and pulley connection 67 to a shaft 68 which carries the gear 65 and is mounted in one portion of a cast metal housing 69. The belt and pulley connection 67 comprises an endless belt 70 which extends around and is driven by a pulley 71 on one end of the armature shaft of the motor 64 and extends around and serves to drive a pulley 72 on one end of the shaft 68. The spiral gear 65 is disposed in the housing 69 and meshes with, and drives the spiral gear 66. The latter is mounted in another portion of the housing 69 and is mounted on and fixedly connected to the lower end of the shaft 48. The housing 69 is provided at one end thereof with an attachment plate 73 whereby it is connected to a cross-member 74 on the bottom frame 52 of the supporting structure 49. When the electric motor 64 is in operation the belt and pulley connection 67 serves through the medium of the shaft 68 to drive the gear 65 and this gear in turn drives the gear 66 and the shaft 48 and effects the desired rotation of the knives 6 and 7.

The discharge chute 30 for receiving the cut ears of corn after they drop from the tubes 12 and 13 through the cut-away 29, is located at one side of the supporting structure 49 for the knives 6 and 7 and is positioned at an angle and in such manner that it operates to feed or deliver the cut corn ears to a washer 75. Struts 76 serve to support the central portion of the chute and the upper end of the chute is attached in any suitable manner to the supporting ring 26.

The operation of the apparatus is as follows: Ears of corn, after being husked, are inserted individually into the tubes 12 and 13 by one or more persons standing in the immediate vicinity of the carrier 8. During rotation of the carrier by the electric motor 31 and rotation of the knives 6 and 7 by the electric motor 64, the ears of corn are swung in a circular course over the stationary supporting ring 26, as hereinbefore described. When the ears of corn swing or move into the paths of the knives the knife 6 severs from the ears the end portions which project above the upper ends of the tubes 12 and 13 and the knife severs the lower ends of the ears, that is the portions of the ears which rest on the ring 26 and extend between the rings and the lower ends of the tubes. After severing of the ends of the ears of corn by the knives, the corn rides over the supporting ring 26 until it encounters the cut-out 29 and then the cut corn drops downwards out of the tubes and slides along the discharge chute 63 to the washer 75. After discharge of the cut ears from the tubes, the tubes are again filled with new ears of corn. By reason of the fact that the knives 6 and 7 are held apart a fixed distance the cut ears of corn are all equal in length. The portions of the corn ears which are severed or cut by the knife 7 are deflected away from the apparatus and constitute scrap or waste whereas the upper ends of the ears, that is the portions which are cut or severed by the knife 6, are discharged onto the chute 63 and may, if desired, be stripped of any kernels of corn thereon.

The herein described corn cutting apparatus is extremely fast as far as operation is concerned and may be produced at a low and reasonable cost due to the fact that it consists of but a small number of parts.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In a corn cutting apparatus of the character described, the combination of a rotary horizontal extending carrier comprising a hub, a plurality of arms extending radially from the hub, a ring surrounding and fixed to the ends of the arms, and an annular series; of vertically extending, open-ended tubes extending around and fixed to the ring and adapted to receive ears of corn and hold them loosely in an upstanding position; a supporting ring arranged concentrically with respect to, and spaced a small distance beneath, the tubes and adapted to hold the ears of corn from dropping through the tubes; a pair of knives disposed one slightly above the upper ends of the tubes and the other over the supporting member and slightly beneath the lower ends of the tubes; and means for rotating the carrier so as to cause the knives respectively to sever the upper and lower ends of the ears and thus make the ears equal in length.

2. In a corn cutting apparatus of the character described, the combination of a supporting structure; a rotary, horizontally extending, disk-like carrier supported above and carried by the supporting structure and comprising a hub, a plurality of arms extending radially from the hub, a ring surrounding and fixed to the ends of the arms, and an annular series of vertical open ended tubes extending around and fixedly secured to the ring and adapted to receive ears of corn and hold them loosely in an upstanding position; a stationary supporting ring arranged concentrically with respect to, and disposed slightly beneath, the tubes and supported by and in spaced relation above the supporting structure for preventing the ears of corn from dropping through the tubes; means mounted on the supporting structure and disposed beneath the carrier, for rotating the latter and a pair of knives positioned one above and one below the tubes and arranged so that during rotation of the carrier they operate respectively to cut the top and bottom projecting ends of the ears of corn and thus make the ears equal in length.

3. In a corn cutting apparatus of the character described, the combination of a supporting structure embodying a plurality of upwardly extending struts; a rotary, horizontally extending, disk-like carrier supported above and carried by the supporting structure and comprising a hub, a plurality of arms extending radially from the hub, a metallic ring surrounding and fixed to the ends of the arms, and an annular series vertical open ended metallic tubes extending around and welded to the ring and adapted to receive ears of corn and hold them loosely in an upstanding position; a stationary supporting ring arranged concentrically with respect to, and disposed slightly beneath, the tubes and supported on the upper ends of the structure for preventing the ears of corn from dropping through the tubes, an electric motor and speed reducing gearing mounted on the supporting structure and connected to drive the carrier; a pair of knives positioned one above and one below the tubes and arranged so that during rotation of the carrier they operate respectively to cut the top and bottom projecting ends of the ears of corn and thus make the ears equal in length; and means comprising a cutout in the supporting ring for discharging the cut ears from the tubes.

MIRON S. CANADAY.